United States Patent
Ootake (10) Patent No.: US 6,843,055 B2
(45) Date of Patent: Jan. 18, 2005

(54) REGENERATION OF DIESEL PARTICULATE FILTER FOR DIESEL ENGINE

(75) Inventor: Makoto Ootake, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/137,683

(22) Filed: May 3, 2002

(65) Prior Publication Data

US 2002/0194843 A1 Dec. 26, 2002

(30) Foreign Application Priority Data

Jun. 22, 2001 (JP) ........................................ 2001-189439

(51) Int. Cl.[7] .............................................. F01N 3/00
(52) U.S. Cl. ........................... 60/297; 60/280; 60/286; 60/292; 60/295; 60/311
(58) Field of Search ......................... 60/274, 285, 295, 60/297, 280, 286, 292, 311, 315

(56) References Cited

U.S. PATENT DOCUMENTS

| 4,835,964 | A | * | 6/1989 | Kume et al. ................. 60/285 |
| 5,826,425 | A | | 10/1998 | Rossi Sebastiano et al. |
| 6,276,130 | B1 | * | 8/2001 | Ito et al. ........................ 60/278 |
| 6,338,245 | B1 | * | 1/2002 | Shimoda et al. .............. 60/285 |
| 6,490,857 | B2 | * | 12/2002 | Sasaki .......................... 60/278 |

FOREIGN PATENT DOCUMENTS

| DE | 199 48 156 A1 | 4/2001 |
| EP | 0 758 713 A1 | 2/1997 |
| JP | 3012249 | 12/1999 |
| JP | 2001-073743 | 3/2001 |

* cited by examiner

*Primary Examiner*—Binh Q. Tran
(74) *Attorney, Agent, or Firm*—Foley & Lardner LLP (57) ABSTRACT

An oxidation promoting catalyst (42) which converts nitrogen monoxide in exhaust gas to nitrogen dioxide, and a diesel particulate filter (41) which traps soot in the exhaust gas, are installed in an exhaust gas passage of a diesel engine (1). A control unit (21) determines whether or not it is necessary to regenerate the filter based on the exhaust gas pressure detected by an exhaust gas pressure sensor (24), and when it is necessary to regenerate the filter, it increases the nitrogen monoxide in the exhaust gas by performing an advance correction of the fuel injection timing of a fuel injector (14) so as to promote generation of nitrogen dioxide by the oxidation promoting catalyst. The nitrogen dioxide decreases the combustion temperature of the soot trapped by the diesel particulate filter (41), and efficiently regenerates the filter.

11 Claims, 6 Drawing Sheets

REGENERATION OF DIESEL PARTICULATE FILTER FOR DIESEL ENGINE

FIELD OF THE INVENTION

This invention relates to regeneration of a filter which traps soot discharged from a diesel engine.

BACKGROUND OF THE INVENTION

Japanese Patent No. 3012249 discloses an oxidation promoting catalyst for regenerating a diesel particulate filter which traps the soot discharged from a diesel engine. The oxidation promoting catalyst is installed upstream of the diesel particulate filter of an engine exhaust passage, and promotes oxidation of nitrogen monoxide (NO) in the exhaust gas to nitrogen dioxide ($NO_2$).

Normally, a temperature of 600° C. or more is required for combustion of soot, but in an atmosphere of nitrogen dioxide which has a powerful oxidizing ability, soot burns at a low temperature of about 275° C.

Therefore, by using an oxidation promoting catalyst, the diesel particulate filter can be regenerated even when the exhaust gas temperature is as low as 275° C.

SUMMARY OF THE INVENTION

The combustion of the soot in the diesel particulate filter is promoted, the larger the nitrogen dioxide amount is in the exhaust gas.

However, nitrogen oxides containing nitrogen monoxide are toxic, so various measures for reducing nitrogen oxides including exhaust gas recirculation (EGR) are used in diesel engines. As a result, if the amount of nitrogen monoxide discharged from the engine decreases, the nitrogen dioxide amount produced by the oxidation promoting catalyst will also decrease, and the regeneration of the diesel particulate filter will become difficult.

It is therefore an object of this invention to temporarily increase the nitrogen oxide discharge amount of the diesel engine when regeneration of the diesel particulate filter is required.

It is another object of this invention to optimize the temperature condition of the diesel particulate filter when regeneration of the diesel particulate filter is required.

In order to achieve the above objects, this invention provides an exhaust gas purification device for such a diesel engine that is provided with a fuel injector. The device comprises a diesel particulate filter which traps soot in an exhaust gas of the diesel engine and an oxidation promoting catalyst which oxidizes nitrogen oxide in the exhaust gas to nitrogen dioxide. The nitrogen dioxide promotes the combustion of the soot trapped by the diesel particulate filter. The device further comprises a sensor which detects a state of the diesel particulate filter, and a programmable controller programmed to determine whether or not the diesel particulate filter is required to be regenerated from the state of the diesel particulate filter, and advance a fuel injection timing of the fuel injector when the diesel particulate filter is required to be regenerated.

This invention also provides a method for regenerating a diesel particulate filter which traps soot in an exhaust gas of a diesel engine. The diesel engine comprises a fuel injector and an oxidation promoting catalyst which oxidizes nitrogen oxide in the exhaust gas to nitrogen dioxide. The nitrogen dioxide promotes the combustion of the soot trapped by the diesel particulate filter. The method comprises detecting a state of the diesel particulate filter, determining whether or not the diesel particulate filter is required to be regenerated from the state of the diesel particulate filter, and advancing a fuel injection timing of the fuel injector when the diesel particulate filter is required to be regenerated.

The details as well as other features and advantages of this invention are set forth in the remainder of the specification and are shown in the accompanying drawings.

DESCRIPTION OF THE PREFERRED EMBODIMENTS

Figure 1:
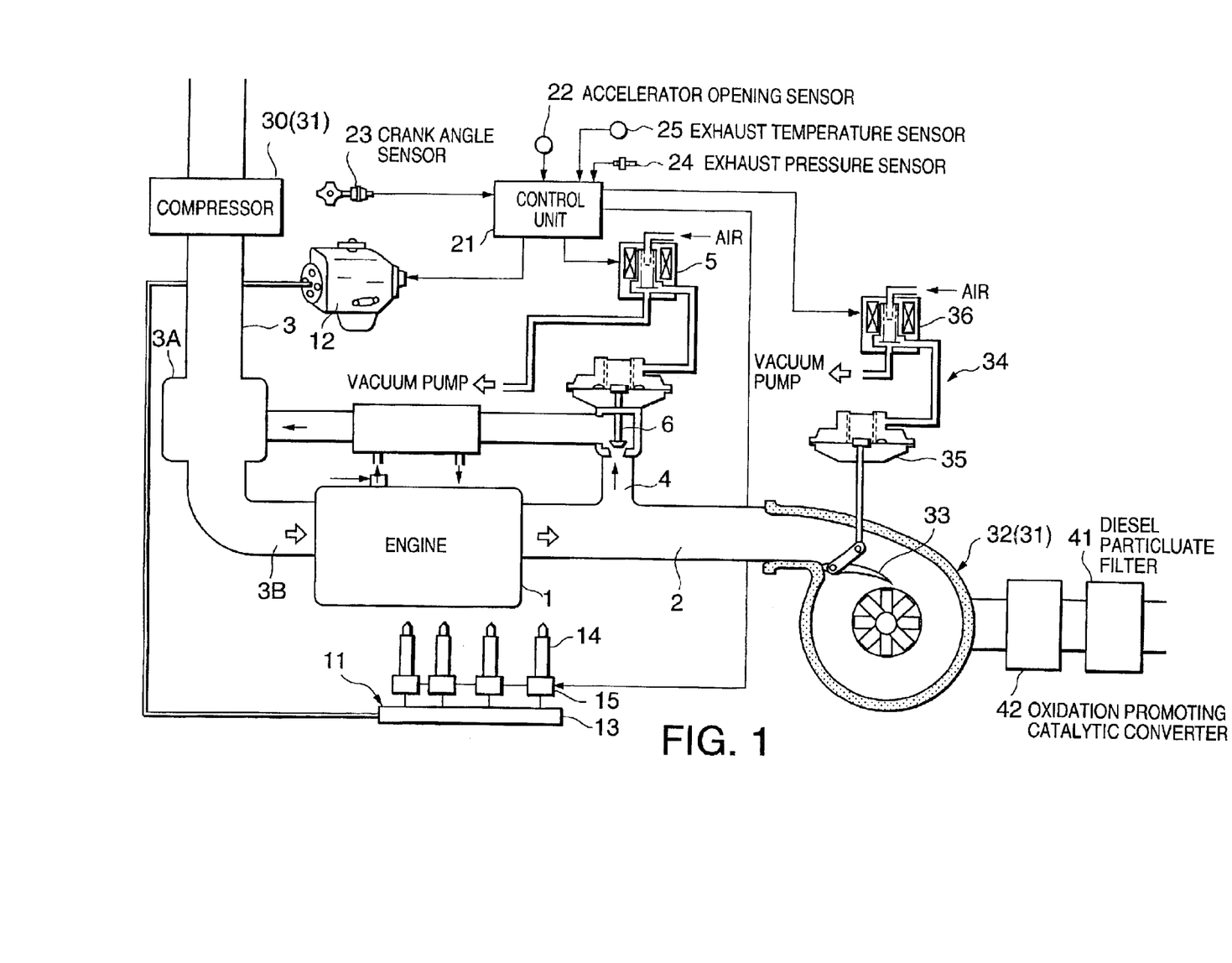
FIG. 1 is a schematic diagram of a diesel engine comprising an exhaust gas emission control device according to this invention.

Referring to FIG. 1 of the drawings, a direct injection multi-cylinder diesel engine 1 for driving a vehicle is provided with an intake passage 3 and an exhaust passage 2.

The intake passage 3 is connected to each combustion chamber of the diesel engine 1 via a collector 3A and intake manifold 3B.

Diesel fuel is injected to each combustion chamber from a fuel injection device 11. The fuel injection device 11 comprises a fuel supply pump 12, a common-rail 13, and plural pairs of fuel injectors 14 and pressure control valves 15. The fuel supply pump 12 supplies fuel to the common-rail 13 and the common-rail 13 temporarily stores pressurized fuel. The fuel injectors 14 inject fuel of the common-rail 13 into respective combustion chambers via the associated pressure control valves 15.

The pressure control valve 15 adjusts the fuel injection timing and the fuel injection period of the fuel injector 14 according to a signal from a control unit 21.

The fuel injected to the combustion chambers is compressed together with the air aspirated from the intake passage 3, burnt by compressed ignition, and is discharged by the exhaust passage 2 as exhaust gas.

In order to suppress the temperature rise in the diesel engine 1 so as to prevent generation of nitrogen oxides, a part of the exhaust gas is recirculated into the collector 3A from an exhaust gas recirculation (EGR) passage 4 which is branched off from the exhaust passage 2.

An exhaust gas recirculation (EGR) valve 6 for adjusting the flowrate of exhaust gas recirculation (EGR) is provided in the EGR passage 4.

The EGR valve 6 is a diaphragm-type valve and adjusts the flowrate of the EGR passage 4 according to the negative pressure supplied from a solenoid driven negative pressure control valve 5.

An exhaust gas turbine 32 of a turbocharger 31 is installed in the exhaust gas passage 2. The exhaust gas turbine 32 rotates due to exhaust gas pressure, drives a compressor 30 installed in the intake passage 3 to supercharge the intake air. The turbocharger 31 is provided with a variable geometry system comprising an adjustable nozzle 33 for increasing the pressure of exhaust gas.

The adjustable nozzle 33 is driven by a diaphragm actuator 35, and increases the exhaust gas pressure which drives the exhaust gas turbine 32 by reducing the flowpath cross-sectional area of exhaust gas flowing into the exhaust gas turbine 32.

The diaphragm actuator 35 varies the opening of the adjustable nozzle 33 according to the negative pressure supplied from a solenoid driven negative pressure control valve 36. The construction of the negative pressure control valve 36 is the same as that of the negative pressure control valve 5. The negative pressure control valves 5, 36 both generate a negative pressure according to a signal from a control unit 21.

A catalytic converter 42 which contains the oxidation promoting catalyst and a diesel particulate filter 41 are provided in series in the exhaust gas passage 2 downstream of the exhaust gas turbine 32.

The diesel particulate filter 41 traps the soot discharged from the diesel engine 1. The diesel particulate filter 41 is formed in a substantially cylindrical shape, and is formed from plural cells substantially parallel to the exhaust gas flow divided by honeycomb-like partitions comprised of a porous material such as ceramics or the like.

The inlet and outlet of each cell are alternately closed.

Specifically, the particulates in the exhaust gas comprise mainly soot and a soluble organic fraction (SOF). The main component of soot is carbon. At the usual exhaust gas temperature, when the exhaust gas flows into an adjacent cell via a partition, soot is trapped by the partition. However, if the exhaust gas temperature is raised, the soot will burn, and will be discharged as carbon dioxide ($CO_2$). The above-mentioned construction of a diesel particulate filter is known from Tokkai 2001-73743 published by the Japanese Patent Office in 2001.

The catalytic converter 42 promotes oxidation of the nitrogen monoxide (NO) in the exhaust gas to nitrogen dioxide ($NO_2$).

In the nitrogen dioxide, the diesel particulate filter 41 burns the trapped soot at a low temperature of about 275° C. The oxidation promoting catalyst is well-known from the above-mentioned Japanese Patent No. 3012249.

Figure 2:
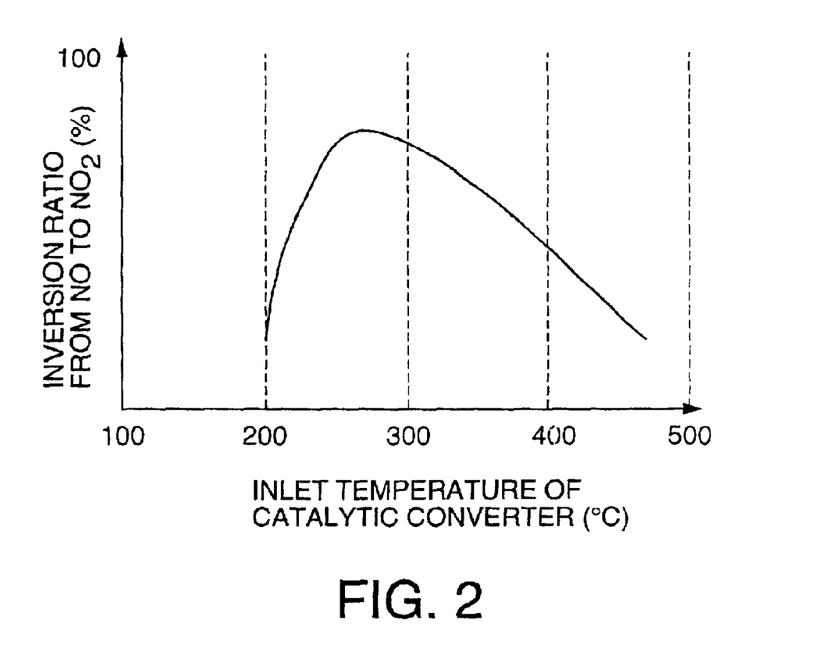
FIG. 2 is a diagram showing a relation between the inlet temperature of a catalytic converter according to this invention, and an inversion ratio from nitrogen monoxide to nitrogen dioxide due to the oxidation by the converter.

The Inventors confirmed the effectiveness of inversion of the nitrogen monoxide (NO) to nitrogen dioxide ($NO_2$) by the oxidation promoting catalyst, by experiment. The result is shown in FIG. 2.

According to this diagram, the conversion ratio from NO to $NO_2$ is a maximum when the inlet port temperature of the catalytic converter is approximately 275° C. Therefore, when the trapped soot amount of the diesel particulate filter 41 has reached an upper limit, the exhaust gas temperature is preferably raised to for example 300° C. including some tolerance to increase the amount of $NO_2$ in the exhaust gas.

This temperature is the temperature at which soot in the diesel particulate filter 41 can be efficiently burned in the presence of $NO_2$.

Figure 3:
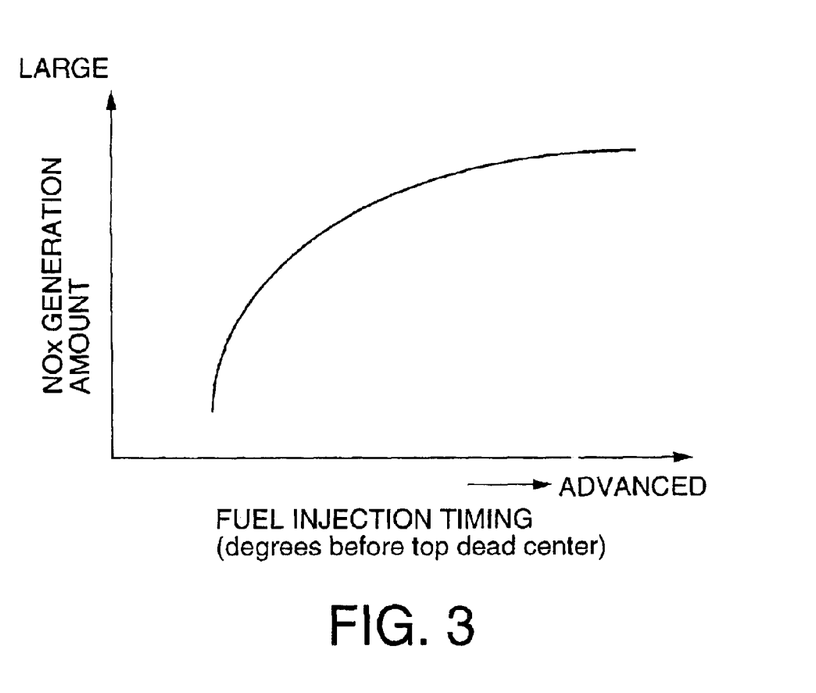
FIG. 3 is a diagram showing a relation between the fuel injection timing of the diesel engine, and nitrogen oxide (NOx) generation amount of the diesel engine.

To increase the exhaust gas temperature, it is effective to lower the supercharging pressure. Moreover, referring to FIG. 3, to increase the NOx generation amount, it is effective to advance the fuel injection timing.

For this reason, the control unit 21 determines whether or not the diesel particulate filter 41 needs to be regenerated, and when regeneration is required, it performs advance correction of the fuel injection timing of the fuel injector 14.

In this case, if the exhaust gas temperature has not reached the target value, the opening of the adjustable nozzle 33 is increased and the inlet temperature of the catalytic converter 42 is raised.

Here, the opening of the adjustable nozzle 33 is increased to prevent the energy of the exhaust gas from being lost and the temperature of the exhaust gas temperature from falling due to the driving of the exhaust gas turbine 32.

For this control, a signal from an exhaust gas pressure sensor 24 which detects an exhaust gas pressure Pexh, an exhaust-gas temperature sensor 25 which detects an exhaust-gas temperature Texh, an accelerator opening sensor 22 which detects an opening of the accelerator pedal of the vehicle, and a crank angle sensor 23 which detects a rotation speed Ne and a predetermined crank angle of the engine 1, are input into the control unit 21.

The control unit 21 comprises a microcomputer provided with a central processing unit (CPU), read-only memory (ROM), random access memory (RAM) and I/O interface (I/O interface). The control unit may also comprise two or more microcomputers.

Figure 4:
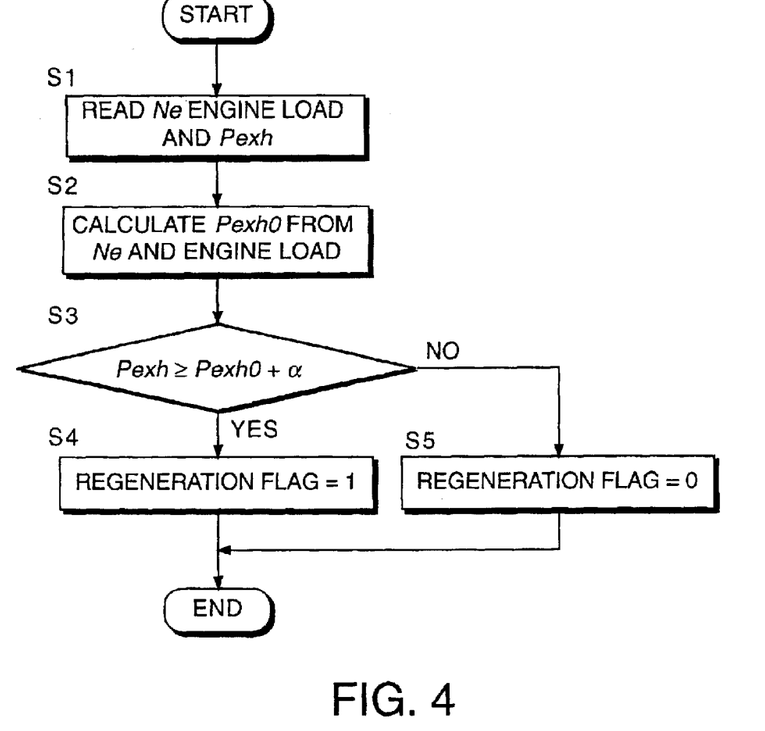
FIG. 4 is a flowchart describing a routine for setting a filter regeneration flag performed by a control unit according to this invention.

Next, referring to FIG. 4, the routine for setting the filter regeneration flag performed by the control unit 21 for this control will be described. This routine is performed at an interval of ten milliseconds during the running of the diesel engine 1.

First, in a step S1, the control unit 21 reads the engine rotation speed Ne, engine load and exhaust pressure Pexh. Here, a target fuel injection amount of the fuel injector 14 is used as a value indicative of the engine load. The method of determining the target fuel injection amount is known from U.S. Pat. No. 5,974,795.

Figure 5:
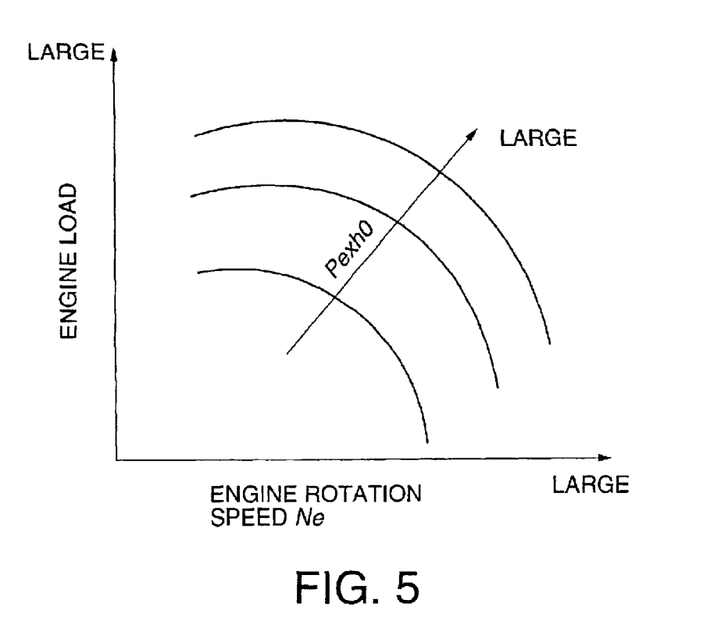
FIG. 5 is a diagram describing the characteristics of a map of a basic exhaust gas pressure stored by the control unit.

In a following step S2, the control unit 21 calculates a basic exhaust pressure Pexh0 by looking up a map having the characteristics shown in FIG. 5 which is prestored in the control unit 21, based on the engine rotation speed Ne and engine load.

In a following step S3, the control unit 21 compares a value obtained by adding an allowance α to the basic exhaust pressure Pexh0 with the measured exhaust gas pressure Pexh.

Here, the basic exhaust pressure Pexh0 corresponds to the exhaust gas pressure upstream of the diesel particulate filter 41 in the state where soot has not accumulated on the diesel particulate filter 41.

If soot accumulates on the diesel particulate filter 41, the flowpath cross sectional area of exhaust gas in the filter 41 will become small, and the exhaust gas pressure will rise.

If the maximum exhaust gas pressure which does not adversely affect the operation of the engine 1 is Pmax, the basic exhaust pressure Pexh0 and the allowance α which are acquired under the same conditions have the following relation:

$$\alpha = Pmax - Pexh0$$

Herein, the allowance α is preferably set equal to approximately three times of the normal exhaust gas pressure.

The basic exhaust pressure Pexh0 varies with the engine specification and the vehicle on which the engine is mounted. Therefore, the map of FIG. 5 is set beforehand by experiment and is stored in the control unit 21.

Now, in a step S3, when the exhaust pressure Pexh is not less than Pexh0+α, the control unit 21 sets the regeneration flag to unity in a step S4.

In the step S3, when the exhaust pressure Pexh is less than Pexh0+α, the control unit 21 resets the regeneration flag to zero in a step S5. The initial value of the regeneration flag is zero.

The control unit 21 terminates the routine after the processing of the step S4 or S5.

Figure 6:
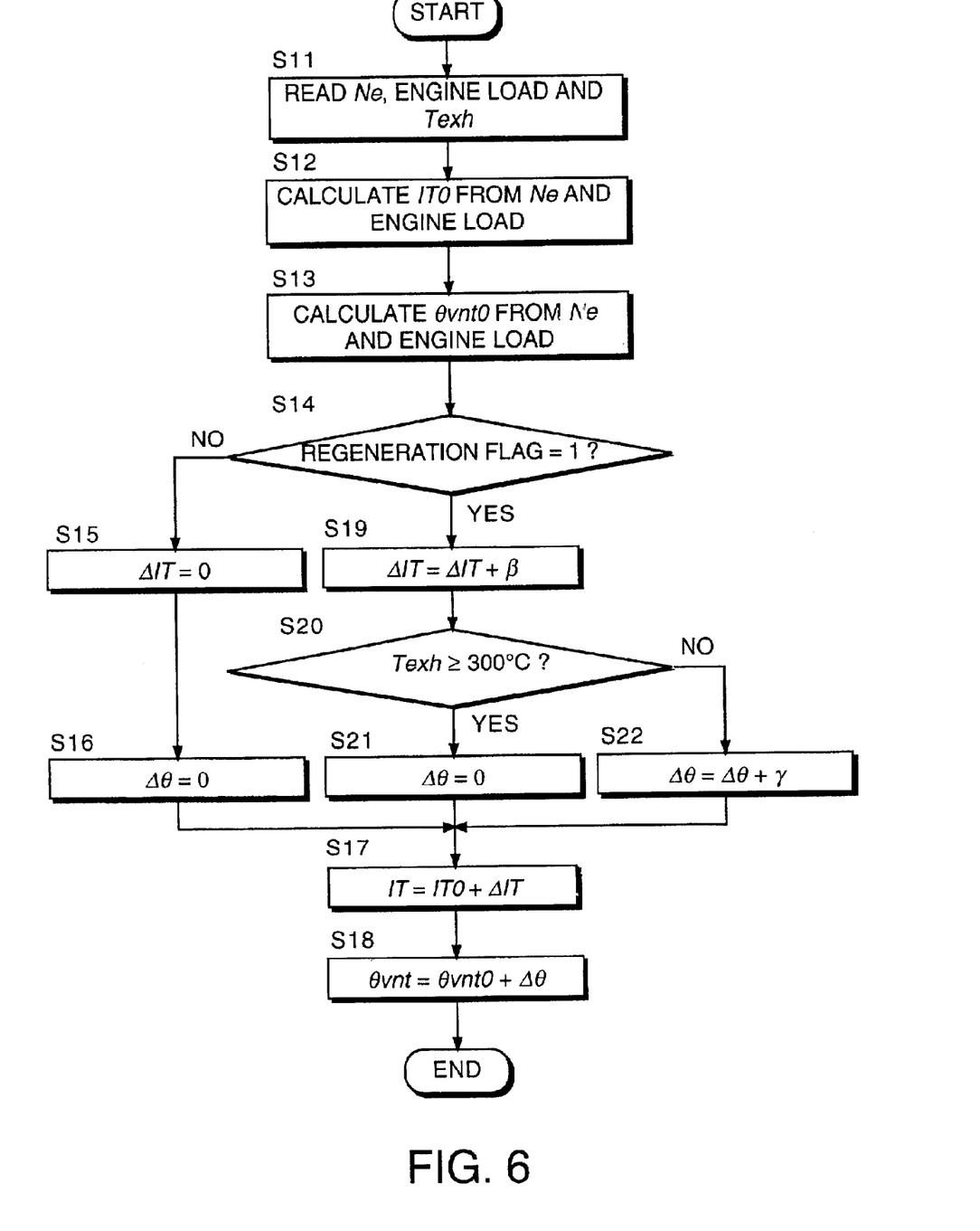
FIG. 6 is a flowchart describing a routine for calculating the fuel injection timing and a nozzle opening performed by the control unit.

Next, referring to FIG. 6, the routine for calculating the fuel injection timing of the fuel injector 14 and the opening of the adjustable nozzle 33 performed by the control unit 21, will be described.

This routine is also performed at an interval of ten milliseconds during the running of the diesel engine 1.

First, in a step S11, the control unit 21 reads the engine rotation speed Ne, engine load and exhaust pressure Pexh.

Figure 7:
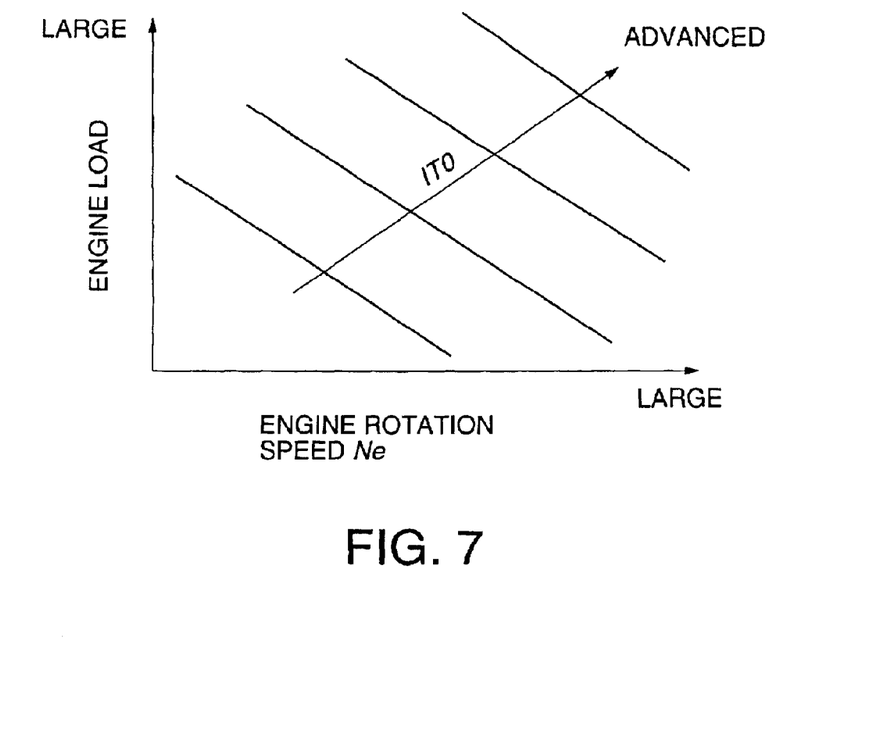
FIG. 7 is a diagram describing the characteristics of a map of a basic injection timing stored by the control unit.

In a following step S12, a basic fuel injection timing IT0 is calculated by looking up a map having the characteristics shown in FIG. 7 which is prestored in the control unit 21, based on the engine rotation speed Ne and engine load.

Figure 8:
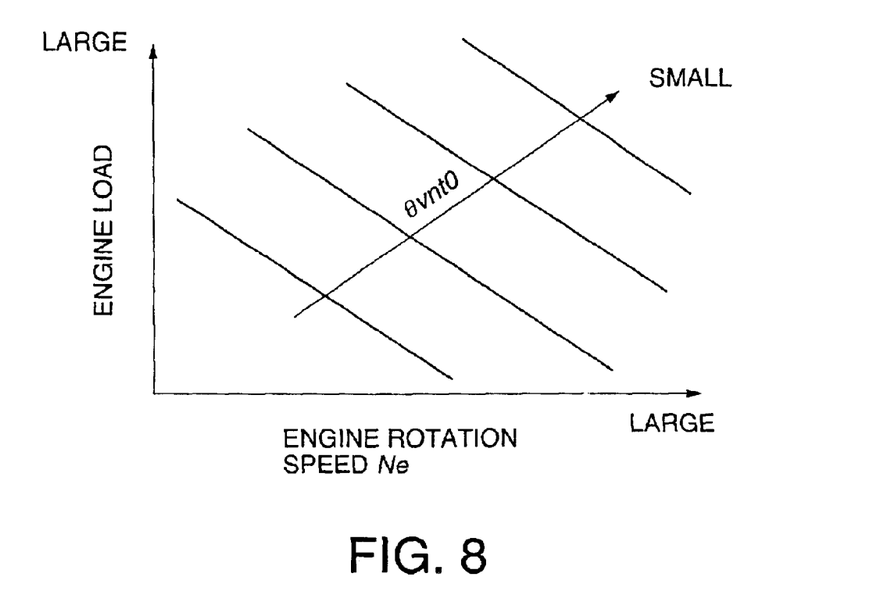
FIG. 8 is a diagram describing the characteristics of a map of a basic nozzle opening stored by the control unit.

In a following step S13, a basic nozzle opening θvnt0 is calculated referring to a map having the characteristics shown in FIG. 8 which is prestored in the control unit 21, based on the engine rotation speed Ne and engine load.

In a following step S14, it is determined whether or not the regeneration flag is unity. When the regeneration flag is not unity, after setting an advance correction amount ΔIT to zero in a step S15 and setting a nozzle opening correction amount Δθ to zero in a step S16, the processing of a step S17 is performed.

When the regeneration flag is unity a predetermined advance increase amount β is added to the advance correction amount ΔIT in a step S19.

The predetermined advance increase amount β is a value for advancing the fuel injection timing and increasing the content of NOx in the exhaust gas. The initial value of the advance correction amount ΔIT is zero. The value of the predetermined advance increase amount β is set equal to one degree.

After the processing of the step S19, the control unit 21, in a step S20, determines whether or not the exhaust gas temperature Texh has reached the target value of 300° C. When the exhaust gas temperature Texh has reached 300° C., after setting the nozzle opening correction amount Δθ to zero in a step S21, the processing of the step S17 is performed. When the exhaust gas temperature Texh has not reached 300° C., a predetermined nozzle opening increase amount γ is added to the nozzle opening correction amount Δθ in a step S22. The predetermined nozzle opening correction amount γ is a correction value which, by increasing the opening of the adjustable nozzle 33, reduces the energy of the exhaust gas used to drive the exhaust gas turbine 32, and raises the exhaust gas temperature by a corresponding amount. The initial value of the nozzle opening correction amount Δθ is zero and the nozzle opening increase amount is set equal to approximately five percent of the full nozzle opening. After the processing of the step S22, the control unit 21 performs the processing of the step S17.

In the step S17, a target fuel injection timing IT is calculated by adding the advance correction amount ΔIT set in the step S15 or S19 to the basic fuel injection timing IT0.

In the following step S18, the nozzle opening correction amount Δθ set in the step S16, S21 or S22, is added to the basic nozzle opening θvnt0 to calculate a target nozzle opening θvnt. After the processing of the step S18, the control unit 21 terminates the routine.

The control unit 21, by outputting signals corresponding to the target fuel injection timing IT and target nozzle opening θvnt respectively to the pressure control valve 15 and the negative pressure control valve 36 in this way, controls the fuel injection timing of the fuel injector 14 and the nozzle opening of the adjustable nozzle 33 to target values, respectively.

According to this routine, when the regeneration flag is unity, if advance correction of the fuel injection timing is performed and the exhaust gas temperature does not reach the target temperature of 300° C., the nozzle opening is corrected in the increase direction.

Advance correction of fuel injection timing is continued until the exhaust gas pressure Pexh is less than Pexh0+α, and increase correction of the nozzle opening is continued until the exhaust gas temperature Texh reaches the target value of 300° C.

If the trapped soot amount of the diesel particulate filter 41 reaches the upper limit, therefore, the fuel injection timing is controlled so that the NOx generation amount is temporarily maximized, and the exhaust gas temperature is also controlled to a temperature suitable for regeneration of the diesel particulate filter 41.

Hence, the regeneration of the particulate filter 41 can be performed efficiently at a relatively low temperature in the vicinity of 300° C.

Thus, according to this invention, even in a diesel engine which performs EGR for NOx reduction, the diesel particulate filter can be efficiently regenerated by temporarily increasing the NOx generation amount during filter regeneration. Further, by controlling the exhaust gas temperature, the diesel particulate filter is always regenerated in an efficient temperature region.

Next, a second embodiment of this invention will be described referring to FIGS. 9 and 10.

In this embodiment, a composite filter 51 which combines both functions is used instead of the diesel particulate filter 41 and the catalytic converter 42.

Figure 9:
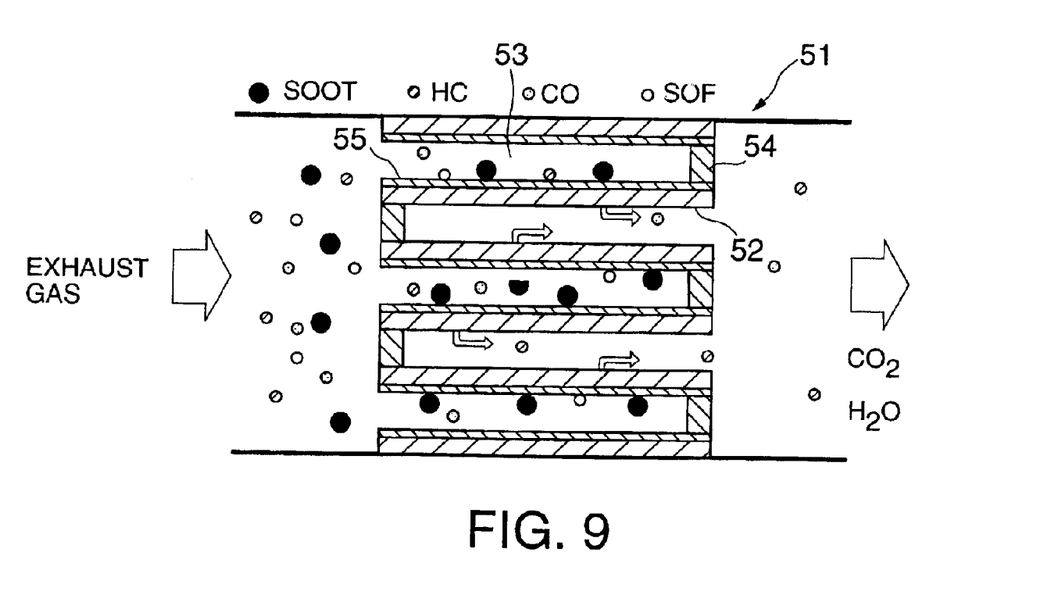
FIG. 9 is a longitudinal cross-sectional view of a diesel particulate filter according to a second embodiment of this invention.

Referring to FIG. 9, the composite filter 51 is formed in a substantially cylindrical shape, and is formed from plural cells 53 parallel to the exhaust gas flow divided by honeycomb-like partitions 52 comprised of a porous material such as ceramics or the like.

The inlet and outlet of each cell are alternately closed by a plug 54.

Figure 10:
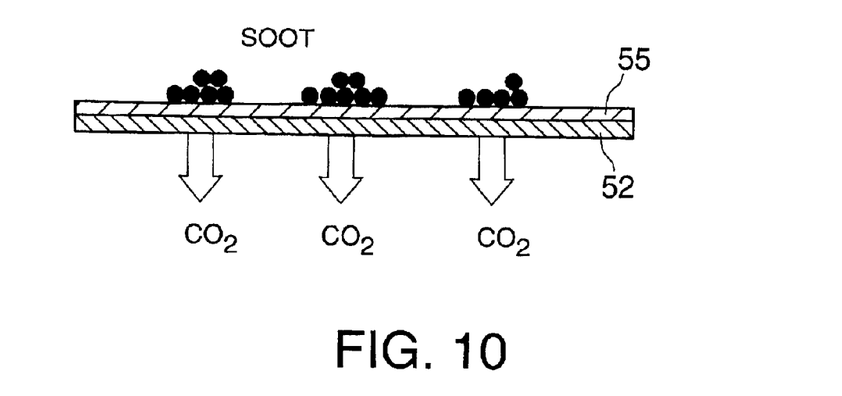
FIG. 10 is an enlarged view of the essential parts of the diesel particulate filter of FIG. 9.

As shown in FIG. 10, an oxidation promoting catalyst 55 is coated on the surface on the upstream side of the partition 52 with respect to the exhaust gas flow. As in the first embodiment, when using this composite filter 51, the control unit 21 performs the routines of FIGS. 4 and 6 for controlling the fuel injection timing and exhaust gas temperature.

In the usual running state of the diesel engine 1, i.e., when control for regenerating the diesel particulate filter 51 is not being performed, correction of fuel injection timing and supercharging pressure is not performed. In this state, the soot in the exhaust gas flowing into the composite filter 51 is trapped by the partition 52.

On the other hand, the carbon monoxide (CO) which is the incomplete combustion component contained in the exhaust gas, hydrocarbons (HC) and the soluble organic fraction both of which are the unburnt component of the fuel, are oxidized by the action of the oxidation promoting catalyst 55, permeate the partition 52 as carbon dioxide ($CO_2$) and steam ($H_2O$), and are discharged into atmosphere.

On the other hand, when the control unit 21 determines that the diesel particulate filter 51 needs to be regenerated, increase of the NOx generation amount and increase of exhaust gas temperature are performed. In this state, in the presence of the oxidation promoting catalyst 55, soot having carbon as its principal component reacts with $NO_2$, oxidizes, permeates the partitions 52 as carbon dioxide ($CO_2$) and nitrogen ($N_2$), and is discharged into the atmosphere.

As a result, the soot is removed from the partitions 52 and the composite filter 51 is regenerated to a state in which it can trap soot again.

The control of fuel injection timing and control of exhaust gas temperature according to this invention also have a desirable effect on a diesel engine using the compound filter 51.

The contents of Tokugan 2001-189439, with a filing date of Jun. 22, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, when the diesel particulate filters 41, 51 are regenerated, the fuel injection timing is advance corrected, and the nozzle opening is corrected in the increase direction when the exhaust gas temperature is low, but a suitable effect can be obtained by correcting only the fuel injection timing without performing correction of the nozzle opening.

Moreover, although it was determined whether or not the diesel particulate filter should be regenerated based on the exhaust pressure, this may also be determined by other methods. For example, it may be determined whether or not the diesel particulate filter 41 should be regenerated based on the elapsed time from startup of the diesel engine 1.

The variable geometry system of the turbocharger 31 is not necessarily limited to the adjustable nozzle 33. A turbocharger provided with a variable geometry system such as a scroll or diffuser, may also be used. Further, this invention may also be applied to a diesel engine comprising a turbocharger of fixed capacity provided with a waste gate valve.

What is claimed is:

1. An exhaust gas purification device for a diesel engine, the diesel engine comprising a fuel injector, comprising:
    a diesel particulate filter which traps soot in an exhaust gas of the diesel engine;
    an oxidation promoting catalyst which oxidizes nitrogen oxide in the exhaust gas to nitrogen dioxide, the nitrogen dioxide promoting the combustion of the soot trapped by the diesel particulate filter;
    a sensor which detects a state of the diesel particulate filter, and
    a programmable controller programmed to:
    determine whether or not the diesel particulate filter is required to be regenerated from the state of the diesel particulate filter, and
    advance a fuel injection timing of the fuel injector when the diesel particulate filter is required to be regenerated.

2. The exhaust gas purification device as defined in claim 1, wherein the controller is further programmed to increase the advance amount of the fuel injection timing according to the duration of the state where the diesel particulate filter is required to be regenerated, continues.

3. An exhaust gas purification device for a diesel engine, the diesel engine comprising a fuel injector, comprising:
    a diesel particulate filter which traps soot in an exhaust gas of the diesel engine;
    an oxidation promoting catalyst which oxidizes nitrogen oxide in the exhaust gas to nitrogen dioxide, the nitrogen dioxide promoting the combustion of the soot trapped by the diesel particulate filter;
    means for detecting a state of the diesel particulate filter;
    means for determining whether or not the diesel particulate filter is required to be regenerated from the state of the diesel particulate filter; and
    means for advancing a fuel injection timing of the fuel injector when the diesel particulate filter is required to be regenerated.

4. A method for regenerating a diesel particulate filter which traps soot in an exhaust gas of a diesel engine, the diesel engine comprising a fuel injector and an oxidation promoting catalyst which oxidizes nitrogen oxide in the exhaust gas to nitrogen dioxide, the nitrogen dioxide promoting the combustion of the soot trapped by the diesel particulate filter, the method comprising:
    detecting a state of the diesel particulate filter;
    determining whether or not the diesel particulate filter is required to be regenerated from the state of the diesel particulate filter; and
    advancing a fuel injection timing of the fuel injector when the diesel particulate filter is required to be regenerated.

5. An exhaust gas purification device for a diesel engine, the diesel engine comprising a fuel injector, an exhaust gas turbine driven by an energy of the exhaust gas prior to flowing into the diesel particulate filter, the exhaust gas turbine driving a compressor for supercharging intake air of the engine, and a mechanism which can decrease the energy of the exhaust gas consumed by the exhaust gas turbine by decreasing a supercharging pressure of the compressor, the device comprising:
    a diesel particulate filter which traps soot in an exhaust gas of the diesel engine;
    an oxidation promoting catalyst which oxidizes nitrogen oxide in the exhaust gas to nitrogen dioxide, the nitrogen dioxide promoting the combustion of the soot trapped by the diesel particulate filter;
    a sensor which detects a state of the diesel particulate filter; and
    a programmable controller programmed to:
    determine whether or not the diesel particulate filter is required to be regenerated from the state of the diesel particulate filter;
    advance a fuel injection timing of the fuel injector, when the diesel particulate filter is required to be regenerated, by controlling the mechanism to decrease the supercharging pressure of the compressor; and
    increase the advance amount of the fuel injection timing, the longer the state where the diesel particulate filter is required to be regenerated, continues.

6. The exhaust gas purification device as defined in claim 5, wherein the exhaust gas purification device further comprises a temperature sensor which detects a temperature of the exhaust gas, and the controller is further programmed to compare the temperature of the exhaust gas with a predetermined temperature, and prevent the mechanism from decreasing the energy of the exhaust gas consumed by the exhaust gas turbine when the temperature of the exhaust gas is not less than the predetermined temperature.

7. The exhaust gas purification device as defined in claim 6, wherein the predetermined temperature is set based on an exhaust gas temperature which maximizes an efficiency of oxidizing nitrogen monoxide to nitrogen dioxide in the oxidation promoting catalyst.

8. The exhaust gas purification device as defined in claim 6, wherein the controller is further programmed to control the mechanism to stop decreasing the energy of the exhaust gas consumed by the exhaust gas turbine when the temperature of the exhaust gas reaches the predetermined temperature in a state where the mechanism is decreasing the energy of the exhaust gas consumed by the exhaust gas turbine.

9. The exhaust gas purification device as defined in claim 5, wherein the sensor which detects the state of the diesel particulate filter comprises a pressure sensor which detects the exhaust gas pressure of the diesel engine, and the control unit is further programmed to determine whether or not it is necessary to regenerate the diesel particulate filter based on the exhaust gas pressure.

10. The exhaust gas purification device as defined in claim 5, wherein the diesel particulate filter and oxidation promoting catalyst are formed as one integrated unit.

11. The exhaust gas purification device as defined in claim 5, wherein the oxidation promoting catalyst is disposed upstream of the diesel particulate filter with respect to the flow of exhaust gas from the diesel engine.

* * * * *